United States Patent
Unnam et al.

(10) Patent No.: US 10,648,314 B2
(45) Date of Patent: May 12, 2020

(54) SYSTEMS AND METHODS FOR SUBSEA FLUID PHASE SEPARATION

(71) Applicant: OneSubsea IP UK Limited, London (GB)

(72) Inventors: Jagadeesh Unnam, Houston, TX (US); John Byeseda, Houston, TX (US)

(73) Assignee: OneSubsea IP UK Limited, London (GB)

( * ) Notice: Subject to any disclaimer, the term of this patent is extended or adjusted under 35 U.S.C. 154(b) by 253 days.

(21) Appl. No.: 15/106,691

(22) PCT Filed: Dec. 22, 2014

(86) PCT No.: PCT/US2014/071976
§ 371 (c)(1),
(2) Date: Jun. 20, 2016

(87) PCT Pub. No.: WO2015/095886
PCT Pub. Date: Jun. 25, 2015

(65) Prior Publication Data
US 2016/0341024 A1 Nov. 24, 2016

Related U.S. Application Data

(60) Provisional application No. 61/919,473, filed on Dec. 20, 2013, provisional application No. 61/928,810, filed on Jan. 17, 2014.

(51) Int. Cl.
*E21B 43/36* (2006.01)
*E21B 43/40* (2006.01)
(Continued)

(52) U.S. Cl.
CPC .......... *E21B 43/36* (2013.01); *B01D 17/0208* (2013.01); *B01D 17/0217* (2013.01);
(Continued)

(58) Field of Classification Search
CPC ..... E21B 43/36; E21B 43/40; B01D 17/0208; B01D 17/0217; B01D 17/06; B01D 17/12;
(Continued)

(56) References Cited

U.S. PATENT DOCUMENTS 3,362,132 A    1/1968  Schellenberg
3,759,324 A *  9/1973  Mecusker .......... B01D 17/0217
                                                166/267
(Continued)

FOREIGN PATENT DOCUMENTS

WO    2013/043354 A1    3/2013

OTHER PUBLICATIONS

International Patent Application No. PCT/US2014/071976 International Search Report and Written Opinion dated Apr. 16, 2015 (8 pages).

*Primary Examiner* — Matthew R Buck
(74) *Attorney, Agent, or Firm* — Conley Rose, P.C.

(57) ABSTRACT

Systems and methods for subsea fluid phase separation. A two phase embodiment of the subsea fluid separation system separates a multiphase flow into gas and liquid phases. A three phase embodiment of the subsea fluid separation system separates multiphase flow into gas, oil, and water phases. The subsea fluid separation systems include a wellhead desander system to remove solids from the multiphase flow, a vertical gas-liquid separation module having associated valves disposed in series with a horizontal gas-liquid separation module having associated valves, one or more pumps to provide fluid flow to the vertical and horizontal separators, and a control system to control operation of the valves and pumps. The three phase embodiment further includes oil-water separators and multi-stage hydrocyclones for produced water treatment in a subsea environment.

18 Claims, 5 Drawing Sheets

(51) Int. Cl.
*B01D 17/02* (2006.01)
*B01D 17/06* (2006.01)
*B01D 19/00* (2006.01)
*B01D 17/12* (2006.01)
*B01D 21/00* (2006.01)
*B01D 21/26* (2006.01)
*B01D 21/30* (2006.01)
*B04C 5/04* (2006.01)
*B04C 5/14* (2006.01)
*B04C 5/28* (2006.01)
*B04C 11/00* (2006.01)

(52) U.S. Cl.
CPC ............. *B01D 17/06* (2013.01); *B01D 17/12* (2013.01); *B01D 19/0036* (2013.01); *B01D 19/0057* (2013.01); *B01D 21/0006* (2013.01); *B01D 21/267* (2013.01); *B01D 21/302* (2013.01); *B04C 5/04* (2013.01); *B04C 5/14* (2013.01); *B04C 5/28* (2013.01); *B04C 11/00* (2013.01); *E21B 43/40* (2013.01)

(58) Field of Classification Search
CPC ............ B01D 19/0036; B01D 19/0057; B01D 21/0006; B01D 21/267; B01D 21/302; B04C 5/04; B04C 5/14; B04C 5/28; B04C 11/00
See application file for complete search history.

(56) References Cited

U.S. PATENT DOCUMENTS

| | | | | |
|---|---|---|---|---|
| 4,066,123 | A | 1/1978 | Skinner et al. | |
| 4,617,031 | A | 10/1986 | Suh et al. | |
| 4,948,393 | A * | 8/1990 | Hodson | B01D 17/00 95/250 |
| 5,298,167 | A * | 3/1994 | Arnold | B01D 17/0208 210/703 |
| 6,197,095 | B1 * | 3/2001 | Ditria | B01D 19/0068 166/267 |
| 6,537,349 | B2 * | 3/2003 | Choi | B01D 53/00 95/247 |
| 7,854,849 | B2 * | 12/2010 | Wang | B01D 17/0214 210/744 |
| 8,808,431 | B2 * | 8/2014 | Di Berardo | B01D 45/04 95/258 |
| 8,894,755 | B2 * | 11/2014 | Bruun | B01D 19/00 95/243 |
| 9,005,339 | B2 * | 4/2015 | Whiteley | B01D 17/0208 95/247 |
| 9,764,252 | B2 * | 9/2017 | Whitney | B01D 17/0217 |
| 9,956,507 | B2 * | 5/2018 | Tuvnes | E21B 43/34 |
| 2003/0146175 | A1 | 8/2003 | Nilsen et al. | |
| 2003/0168391 | A1 | 9/2003 | Tveiten | |
| 2011/0139625 | A1 * | 6/2011 | Arntzen | B01D 17/0214 204/662 |
| 2013/0112392 | A1 | 5/2013 | Karpinski | |

* cited by examiner

SYSTEMS AND METHODS FOR SUBSEA FLUID PHASE SEPARATION

CROSS-REFERENCE TO RELATED APPLICATIONS

The present application is a 35 U.S.C. § 371 national stage entry of PCT/US2014/071976, filed Dec. 22, 2014, entitled "Systems and Methods for Subsea Fluid Phase Separation," which claims priority to U.S. Provisional Patent Application No. 61/919,473, filed Dec. 20, 2013, entitled "System and Method for Subsea Gas-Liquid Separation," and U.S. Provisional Patent Application No. 61/928,810, filed Jan. 17, 2014, entitled "Systems and Methods for Subsea Gas-Liquid Separation," which are hereby incorporated by reference in their entirety.

STATEMENT REGARDING FEDERALLY SPONSORED RESEARCH OR DEVELOPMENT

Not applicable.

BACKGROUND

For deep-water systems, pressure drop across pipelines and risers limits flow and ultimate hydrocarbon recovery. Further, recovered hydrocarbons often flow in multiple fluid phases, such as various combinations of oil, water, and gas. The fluid phases can be separated into separate fluid flows for better recovery. However, slugging complicates the design and operation of topside separation equipment and additionally makes operation of a subsea separator more complex.

For mature fields that see increase in water production, total hydrocarbon recovery is reduced due to issues such as higher pressure drops across the pipelines, overcapacity to the topside processing equipment and depleted reservoir pressure. Subsea oil water separation with water injection can reduce the pressure drop through gas and liquid pipelines, debottleneck topside processing equipment, improve flow assurance by reducing free water content and reduce occurrences of slugging via transportation of gas and liquid through separate risers.

BRIEF SUMMARY OF THE DISCLOSURE

In one embodiment, a system for subsea fluid phase separation includes a vertical gas-liquid separation module having at least one associated valve and a horizontal gas-liquid separation module having at least one associated valve and disposed in series with the vertical gas-liquid separation module. The subsea fluid phase separation system further includes one or more pumps to provide fluid flow out of the vertical and horizontal gas-liquid separation modules and a control system to control operation of the one or more pumps and the associated valves.

In one embodiment, a method for fluid phase separation includes configuring a horizontal vessel in series with a vertical gas-liquid separation vessel and receiving an indication of a level or a pressure of the horizontal vessel and the vertical gas-liquid separation vessel. The method for fluid phase separation also includes performing, based on the indication, a processing operation that generates a control signal to control operation of a pump that provides fluid flow into and/or out of the vessels or generates a control signal to control operation of at least one valve associated with the vessels.

In one embodiment, a control system for fluid phase separation includes a split-range controller configured to adjust at least one control valve and adjust a discharge speed of at least one pump to optimize operation.

In one embodiment, a method to control and discharge hydrocyclone rejects to an oil pipeline by use of an ejector in a subsea application includes controlling a motive fluid rate to the ejector by setting a constant differential pressure across a control valve for a last hydrocyclone in a series of hydrocyclones, thereby providing a driving force for rejects from all hydrocyclones and optimizing the motive fluid rate.

In one embodiment, a system includes a configuration of multi-stage hydrocyclones, including liquid-liquid hydrocyclones in series with a solid-liquid hydrocyclones in series with another liquid-liquid hydrocyclones, for produced water treatment in a subsea environment to enable water re-injection. Moreover, the configuration of hydrocyclones assist in breaking solids-stabilized emulsion particles and increase overall efficiency of solids removal from the water.

Embodiments described herein comprise a combination of features and advantages intended to address various shortcomings associated with certain prior devices, systems, and methods. The foregoing has outlined rather broadly the features and technical advantages of the disclosure such that the detailed description of the disclosure that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the disclosure. It should also be realized by those skilled in the art that such equivalent constructions do not depart from the spirit and scope of the disclosure as set forth in the appended claims.

BRIEF DESCRIPTION OF THE DRAWINGS

For a detailed description of the preferred embodiments, reference will now be made to the accompanying drawings in which.

DETAILED DESCRIPTION

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosures, including the claims, is limited to that embodiment.

Certain terms are used throughout the following description and claim to refer to particular system components. This document does not intend to distinguish between components that differ in name but not function. Moreover, the drawing figures are not necessarily to scale. Certain features of the disclosure may be shown exaggerated in scale or in somewhat schematic form, and some details of conventional elements may not be shown in the interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Still further, reference to "up" or "down" may be made for purposes of description with "up," "upper," "upward," or "above" meaning generally toward or closer to the surface of the earth, and with "down," "lower," "downward," or "below" meaning generally away or further from the surface of the earth.

The present disclosure relates to a multiphase subsea separation system, which may be operated during transient flow. In accordance with various embodiments, the disclosed systems and methods may be utilized in deep water environments and long step outs. Dynamic process simulations are employed to evaluate and optimize the system design. Various embodiments are directed to dynamic simulation architecture, case studies for various transient profiles, separator performance, and control parameters. The subsea separation system may, for example, operate using closed control loops. The present disclosure further relates to a system for subsea gas-liquid separation as well as subsea water-oil separation with water treatment and injection, including a control system.

Figure 1:
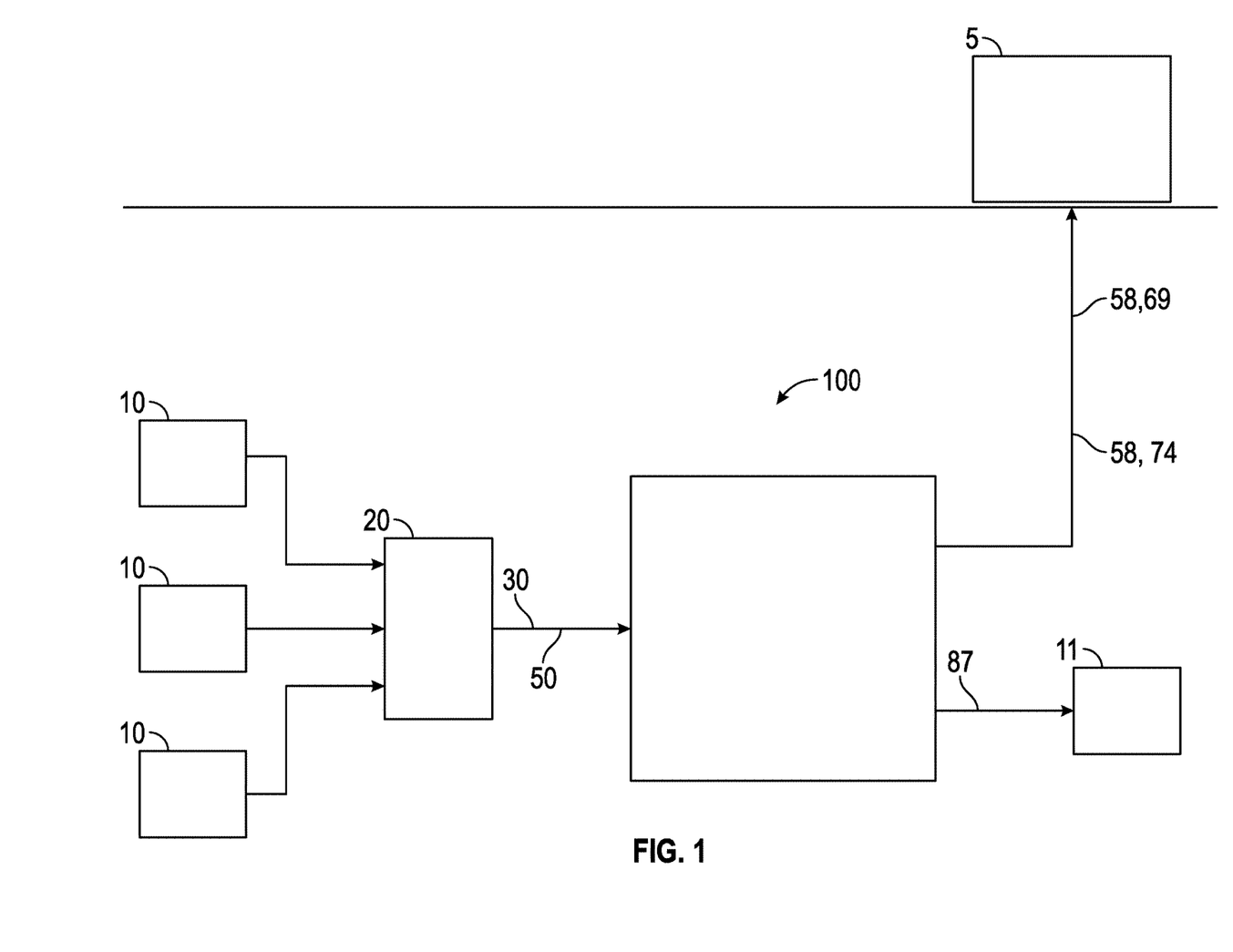
FIG. 1 is a schematic illustration of a subsea phase separation system in accordance with the principles described herein.

Referring now to FIG. 1, a subsea phase separation system 100 is shown. The subsea phase separation system 100 receives multiphase flow 50 from a single flowline 30 coming off a manifold 20, and produces separated phases 58, 69, 74 for transport topside 5. In the present embodiment, three producing wells 10 flow into the manifold 20. In other embodiments, any number of wells 10 may feed into the manifold 20 to produce single flowline 30. In a first embodiment 1000 of the subsea phase separation system 100 (shown in FIG. 2), the separation system separates the multiphase flow 50 into gas 58 and liquid 69 phases, and thus may be referred as a two phase separation system. In a second embodiment 2000 of the subsea phase separation system 100 (shown in FIG. 5), the separation system separates the multiphase flow 50 into gas 58, oil 74, and water 87 phases, and thus may be referred to as a three phase separation system.

Figure 2:
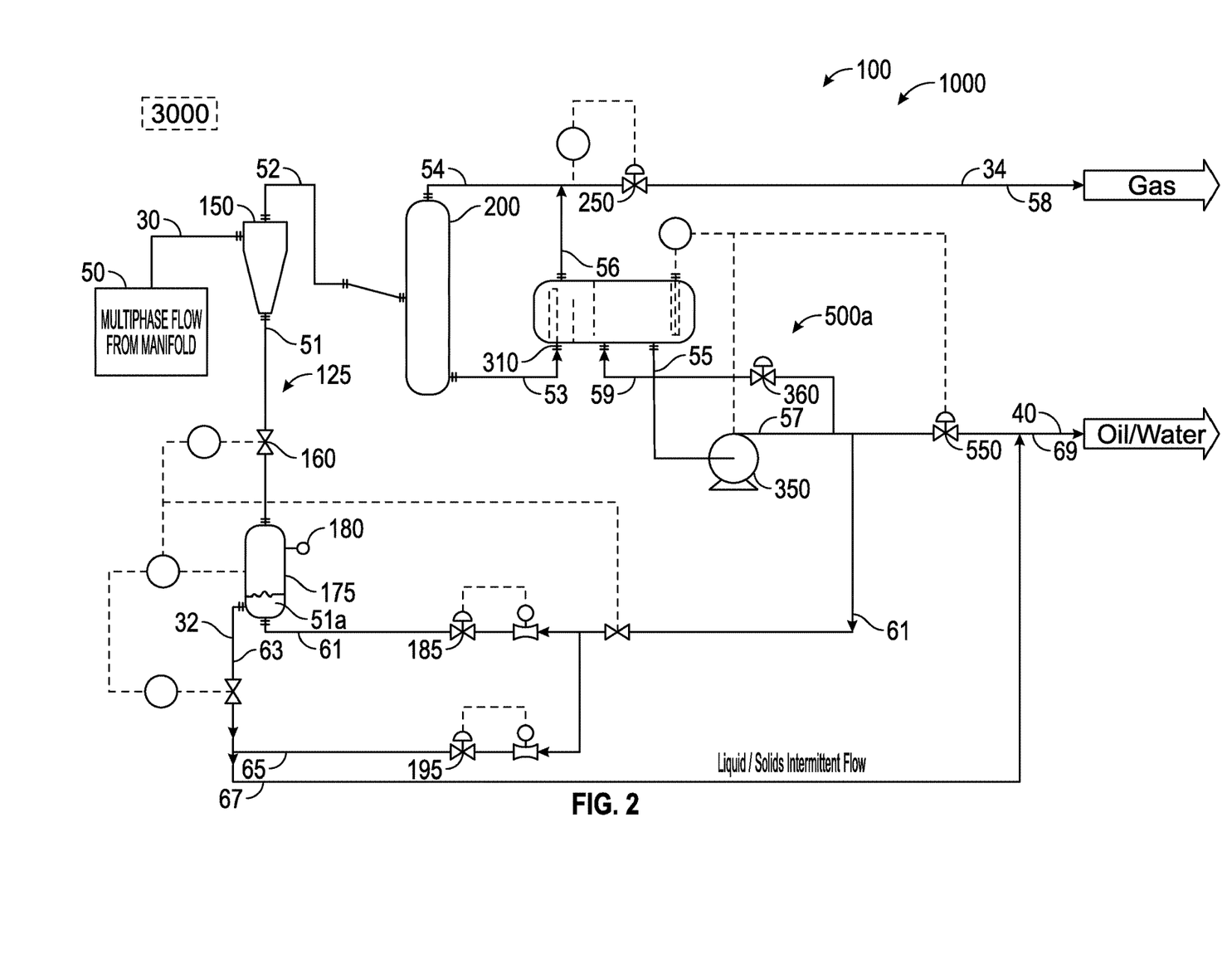
FIG. 2 is a simplified process flow diagram of a two phase embodiment of the subsea phase separation system of FIG. 1.

Referring now to FIG. 2, the first embodiment or two phase separation configuration 1000 of the subsea phase separation system 100 is shown. The two phase separation configuration 1000 comprises a wellhead desander system 125, gas-liquid separators 200, 300, pump 350, and a liquid recycle system 500a. The wellhead desander system 125 comprises a cyclonic wellhead desander 150 and desander accumulator 175. The wellhead desander system 125 separates solids that are produced through multiphase production to prevent potential solids from building up and to prevent erosional issues in the separation equipment downstream of the desander system 125. A multiphase flow 50 enters the wellhead desander 150, where solids 51a are separated by centrifugal force. A solids stream 51 exits the bottom of the desander 150 and enters a desander accumulator 175, where the solids 51a settle. In the present embodiment, the wellhead desander 150 is a solid-liquid hydrocyclone sized according to design guidelines standard in the art that account for design flow conditions. A multiphase flow stream 52 exits the top of the desander 150 and enters a vertical cyclonic gas-liquid separator 200.

Figure 3:
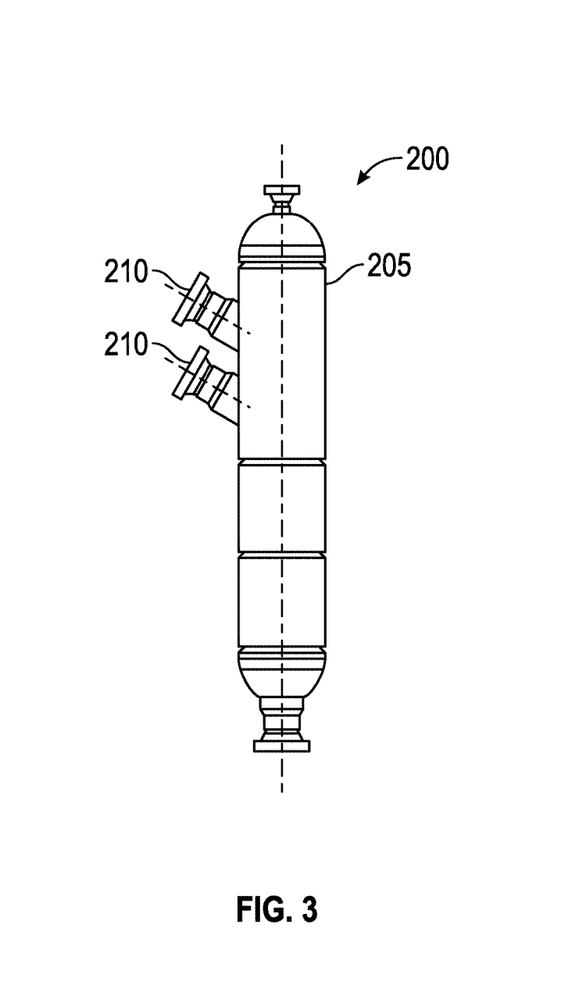
FIG. 3 is a side view of a vertical separator vessel of the subsea phase separation system of FIG. 1.

Referring now to FIGS. 2 and 3, in the present embodiment, the gas-liquid separator 200 is a vertical cyclonic gas-liquid separator or gas liquid cylindrical cyclone (GLCC). The separator 200 is a compact two phase separator comprising a vessel 205 and an inclined tangential inlet 210 that allows rapid phase separation. The vertical separator 200 provides gas liquid separation in a compact system to allow the gas and liquid to be transported to topsides 5 through individual pipelines 34, 40, respectively. The gas-free liquids enable operation of a gas tolerant single phase pump system 350. In the present embodiment, the single phase pump system 350 comprises one pump; however, additional pump(s) may be used depending on flow capacity. The pump 350 increases pressure of the fluid to deliver the fluids topside 5 through pipeline 40. The liquid level and pressure of the vertical separator 200 are maintained through the liquid level in the horizontal separator 300 and control valves, such as pressure control valve 250 and level control valve 550.

Referring now to FIG. 2, a vertical separator liquid output stream 53 exits the bottom of the vertical cyclonic gas-liquid separator 200 and enters a horizontal gravity gas-liquid separator 300. A vertical separator gas output stream 54 exits the vertical separator 200 and is routed topside 5 through a gas riser (not shown) via pressure control valve 250. Pressure loss in the pipeline 34 and riser allows liquids to condense; thus, some liquids will also be carried in pipeline 34. However, the liquid carry over is reduced by the vertical gas-liquid separator 200. Pressure control valve 250 allows control of operating pressure in both the vertical separator 200 and the horizontal separator 300. The vertical separator 200 provides quick separation of gas from the liquid phase; however, the vertical separator 200 does not provide enough residence time for buffering surge volume due to pipeline slugging. The vertical separator 200 is paired with the horizontal separator 300 to provide the necessary residence time for buffering surge volume. The level of liquid in the vertical and horizontal vessels 205, 305, respectively, is maintained using a split-range control of the level control valve 550 disposed downstream of the horizontal separator 300, and by manipulating the pump speed of pump 350. The vertical cyclonic gas-liquid separator 200 and the horizontal gravity gas-liquid separator 300 may be any suitable vertical and horizontal gas-liquid separator known in the art.

Figure 4:
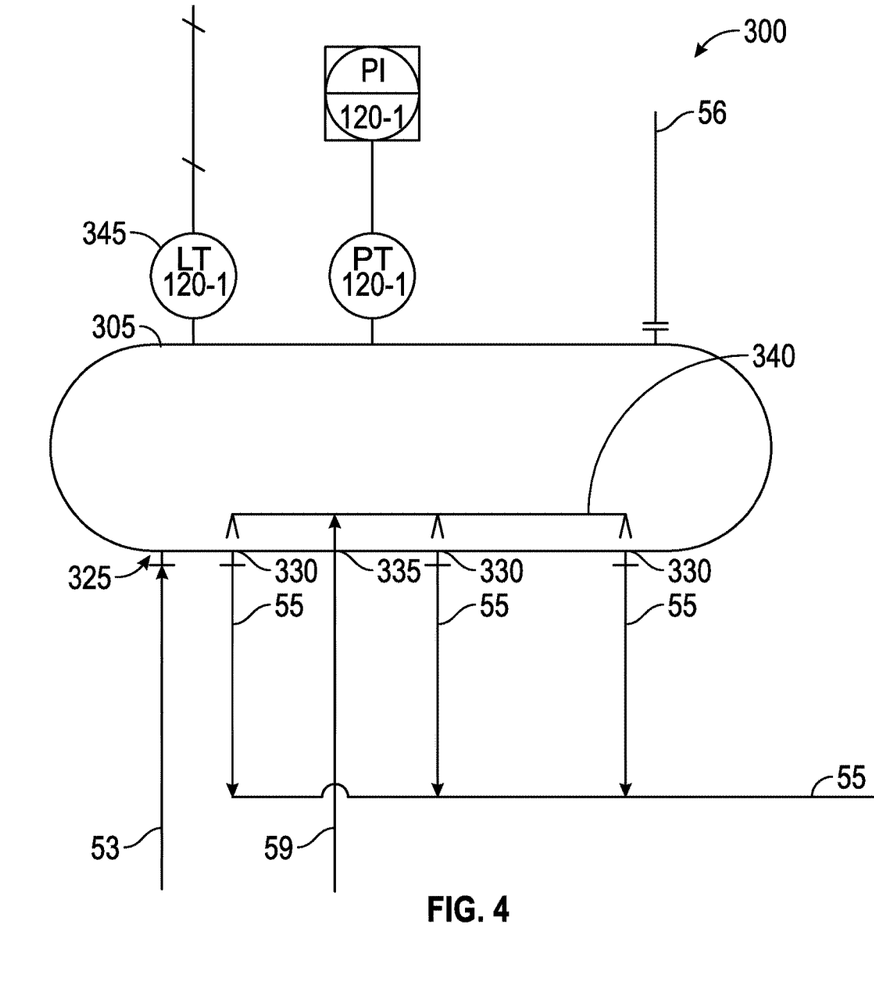
FIG. 4 is a simplified partial process flow diagram of a horizontal separator.

Referring now to FIGS. 2 and 4, the horizontal separator 300 comprises a vessel 305 and a large inlet 310 from the vertical separator 200 to hydraulically balance the vertical and horizontal separator vessels 205, 305, respectively, and provide a minimum liquid level difference between the vertical and horizontal separator vessels 205, 305, respectively. The horizontal separator 300 further comprises a plurality of outlets 330 in the bottom of horizontal separator vessel 305. In some embodiments, the outlets 330 include nozzles for pressurizing or jetting the fluid flowing through the outlets 330. The size of the horizontal separator vessel 305 is configured to accommodate any particular dynamic slugging volume, and thus allows liquid to accumulate and accommodates operating levels and surges. A horizontal separator gas output stream 56 exits the horizontal separator 300 and combines with the vertical separator gas output stream 54 exiting the vertical separator 200 in combined fluid stream 58, which is then routed topside through pipeline 34 via pressure control valve 250. The horizontal separator 300 reduces the gas carry-under in horizontal separator liquid output streams 55 exiting the horizontal separator 300 at outlets 330. The combined horizontal separator liquid output stream 55 enters pump 350, which pressurizes and discharges pump discharge stream 57 topside through liquid pipeline 40.

Referring still to FIGS. 2 and 4, a liquid recycle system 500a maintains a minimum flow rate through the pump 350 with multivariable controllers (not shown) that control choke valve 360 located downstream of pump 350. The liquid recycle system 500a allows a portion of the pump discharge stream 57 discharged from the pump 350 to be redirected back into the horizontal separator vessel 305 as redirected pump discharge stream 59. The redirected pump discharge stream 59 can be reintroduced into the horizontal separator 300 through inlet 335 for sand jetting. A portion of the redirected pump discharge stream 59 can further be redirected back to the vertical separator liquid output stream 53 via a valve (not shown) to reenter the horizontal separator 300 at inlet 310. The amount of redirected pump discharge stream 59 used is controlled from the choke control valve 360 disposed downstream of the pump 350, and by manipulating the pump speed of pump 350.

Referring now to FIG. 4, the horizontal separator vessel 305 comprises a particle or sand flushing or jetting system 325 that includes the plurality of outlets 330, an inlet 335, and a sand jet header 340. The plurality of outlets 330 is configured to keep fluid movement along the bottom of the vessel 305 to prevent sand deposition as much as possible. The jet header 340 is configured to sweep solids that may settle in the horizontal vessel 305 into the liquid outlet 55. In a sand jetting cycle, the redirected pump discharge stream 59 enters the horizontal separator vessel 305 at inlet 335 and hits the sand jet header 340 and disburses across the bottom of the horizontal separator vessel 305 to flush out sand from the horizontal vessel 305; thus, redirected pump discharge stream 59 may also be referred to as motive stream 59. A sand jetting cycle is initiated either manually or automatically with a timer or based on the level of sand. A timer may be set to initiate a sand jetting cycle at set increments during normal operation, which may help keep the lines from cooling to hydrate temperatures. The exact increments of time may be determined from a cool-down analysis for the piping that is not in continuous operation. A particular level of sand accumulation may be set to initiate a sand jetting cycle—if an amount of sand accumulation becomes higher than a predetermined level or set point in the horizontal vessel 305, the sand jetting cycle is initiated. The level of sand accumulation is measured with a level profiler 345. In other embodiments, a timer may be set to initiate a sand jetting cycle more or less frequently depending on the level of sand accumulation.

Referring now to FIG. 2, when the level of accumulated solids 51a becomes higher than a predetermined level or set point in the desander accumulator 175, a flushing cycle is initiated to flush the solids 51a out of the desander accumulator 175. In the present embodiment, the level of sand accumulation is measured with a level profiler 180, which monitors the vertical profile of solids 51a and liquid in the desander accumulator 175. The level profiler 180 may be any device known in the art suitable for detecting levels of solids including, but not limited to, a gamma ray intensiometer level profiler. A valve 160 between the wellhead desander 150 and the desander accumulator 175 is closed to allow normal operation through the remaining portions of separation system 1000, and valves 185, 190 are opened to allow a portion 61 of the pressurized discharge fluid 57 from pump 350 be redirected to enter the desander accumulator 175. The redirected portion 61 of the pressurized discharge fluid 57 is used to fluidize the accumulated solids 51a and flush the solids 51a out of the desander accumulator 175; thus, redirected portion 61 may also be referred to as a motive fluid 61. The motive fluid 61 enters the accumulator 175 and fluidizes the settled solids 51a bed that has at its core a low pressure vortex that acts to induct the solids 51a from the accumulator 175 in a discharged slurry 63. The discharged slurry 63 is further diluted with dilution fluid 65, which is also sourced from the motive fluid 61 exiting the pump 350. The addition of the dilution fluid 65 further dilutes the solids 51a and increases the velocity to provide flow assurance and prevent plugging of the lines. An amount of the dilution fluid 65 is used to achieve a predefined concentration of solids 51a that facilitates transportation of the combined discharged slurry 63 and dilution fluid 65, or diluted slurry 67. The diluted slurry 67 is combined back with liquid stream 57 in liquid outlet pipeline 40 downstream of the level control valve 550. The differential pressure that is generated by operation of the valve 550 acts as a virtual pump to cause the flow of motive fluid 61. Flushing the solids 51a collected in the desander accumulator 175 is an intermittent process done as needed based on the level of solids 51a.

Figure 5:
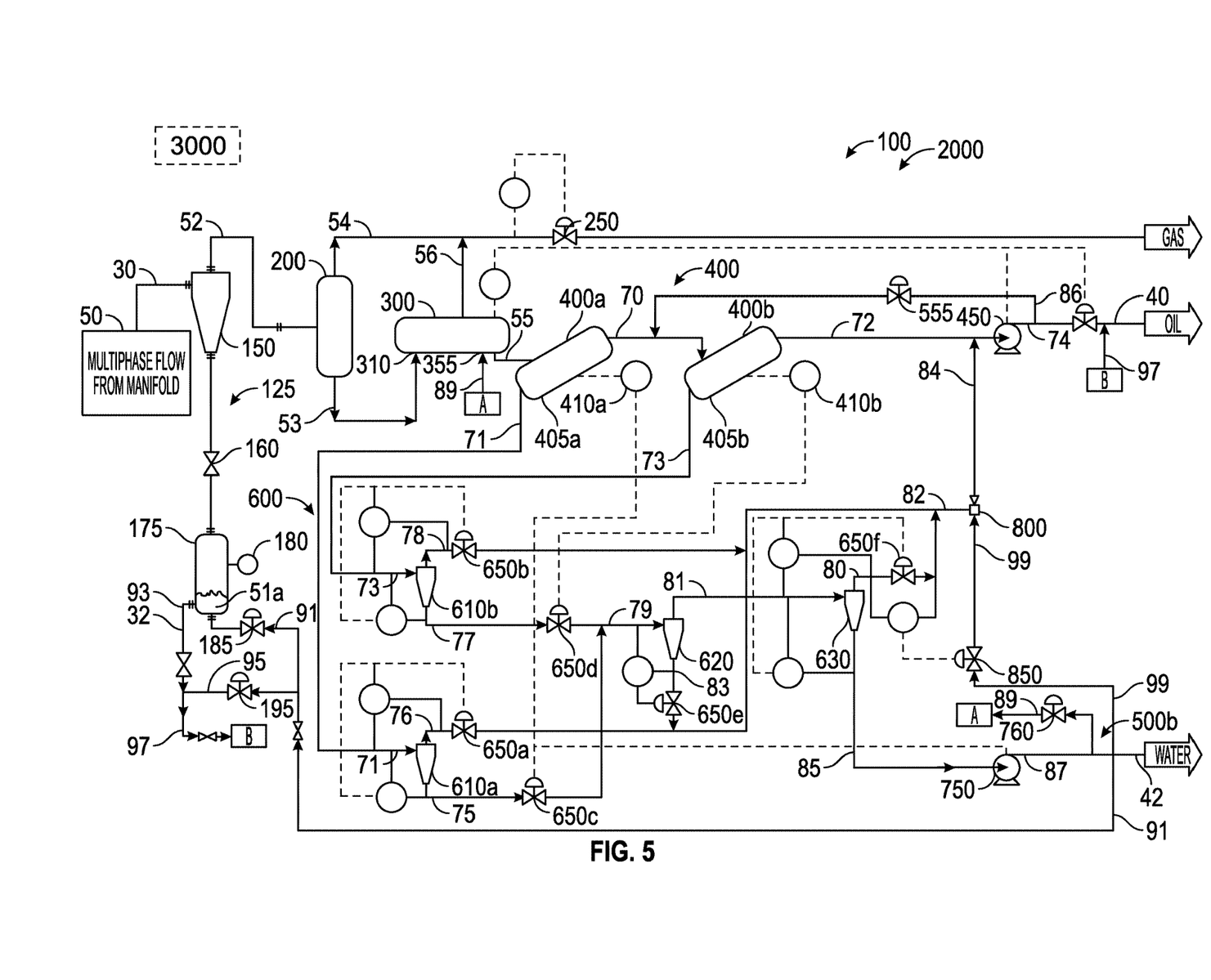
FIG. 5 is a simplified process flow diagram of a three phase embodiment of the subsea phase separation system of FIG. 1.

Referring now to FIG. 5, the second embodiment or three phase separation configuration 2000 of the subsea fluid phase separation system 100 is shown. The three phase separation configuration 2000 comprises a wellhead desander system 125, gas-liquid separators 200, 300, oil-water separator system 400, water treatment system 600, an ejector 800, and pumps 450, 750. Several components of the three phase embodiment 2000 are similar to components of the two phase embodiment 1000, and for simplicity will not be described in full detail below. For example, the wellhead desander system 125 and gas-liquid separators 200, 300 of the three phase embodiment 2000 are similar to that of the two phase embodiment 1000. Like parts are designated with like reference numerals.

The wellhead desander system 125 is similar to the wellhead desander system 125 of the first embodiment or two phase separation configuration 1000. Like parts are designated with like reference numerals. A multiphase flow 50 enters the wellhead desander 150, where solids 51a are separated by centrifugal force. The solids stream 51 exits the bottom of the desander 150 and enters a desander accumulator 175, where the solids 51a settle. The multiphase flow stream 52 exits the top of the desander 150 and enters the vertical cyclonic gas-liquid separator 200.

Referring now to FIGS. 3-5, in the present embodiment, the vertical cyclonic gas-liquid separator or gas liquid cylindrical cyclone (GLCC) 200 is similar to the vertical separator of the two phase separation configuration 1000. Like parts are designated with like reference numerals. Inclined tangential inlets 210 in vessel 205 allow rapid phase separation. The vertical separator 200 separates the gas, which exits the vertical separator vessel 205 in the vertical separator gas output stream 54 to be transported to topsides 5 through pipeline 34 via pressure control valve 250. The liquid output stream 53 exits the bottom of the vertical separator 200 and enters the horizontal gravity gas-liquid separator 300. The liquid pressure of the vertical separator 200 is maintained through pressure control valve 250. The level of liquid in the vertical and horizontal vessels 205, 305, respectively, is maintained by controlling the oil discharge rate; the level control valve 550 is controlled through a level transmitter located in the horizontal vessel 305.

Referring now to FIGS. 4 and 5, the horizontal separator 300 is similar to the horizontal separator of the two phase separation configuration 1000. Like parts are designated with like reference numerals. The liquid output stream 53 from vertical vessel 205 enters the large inlet 310 of horizontal vessel 305 from the vertical separator 200. The horizontal separator gas output stream 56 exits the horizontal separator 300 and combines with the vertical separator gas output stream 54 exiting the vertical separator 200 in combined fluid stream 58, which is then routed topside through pipeline 34 via pressure control valve 250. The gas-free liquid, or combined horizontal separator liquid output stream 55, then enters the oil-water separator system 400, which removes water from the oil. The level of liquid in the horizontal vessel 305 is controlled by the level control valve 550 disposed downstream of the horizontal separator 300, and by manipulating the pump speed of oil pump 450.

Referring now to FIG. 5, the oil-water separation system 400 comprises two oil-water separators 400a, 400b comprising a vessel 405a, 405b, respectively. In the present embodiment, the oil-water separators 400a, 400b are disposed in series and inclined to reduce settling distance for separated droplets and improve solids handling capability. The combined horizontal separator liquid output stream 55 enters the first oil-water separator 400a, which removes bulk water from the oil. A first oil stream 70 exits the first oil-water separator 400a while a first remaining oily water stream 71 exits the first oil-water separator 400a through a separate exit. The first oil stream 70 next enters the second oil-water separator 400b for the additional removal of water from the oil. A second oil stream 72 exits the second oil-water separator 400b while a second remaining oily water stream 73 exits the second oil-water separator 400b through a separate exit. The second oil stream 72 enters boosting pump 450, which pressurizes and discharges a pump discharge stream 74 topside through liquid pipeline 40. A portion 86 of the pump discharge stream 74 may also be redirected back into first oil stream 70 to be reinserted into the second oil-water separator 400b; a control valve 555 maintains a minimum flow of stream 86.

The oil-water interface within the oil-water separation system 400 is maintained by controlling discharge of the water pump 750 downstream of the oil-water separators 400a, 400b and using a split-range control of the level control valves 650c, 650d disposed downstream of a first and second liquid-liquid hydrocyclone 610a, 610b, respectively. Each oil-water separator 400a, 400b further includes an individual level transmitter 410a, 410b, respectively, to measure the gas-liquid interface and control level control valves 650c, 650d, respectively. The level transmitters 410a, 410b are configured to maintain a constant water-oil interface as water flow changes, and to provide a shutdown signal if gas accumulates in the top of either vessel 405a, 405b. The oil-water separators 400a, 400b may be any suitable oil-water separator known in the art including, but not limited to, compact electrostatic separators and gravity separators.

Figure 6:
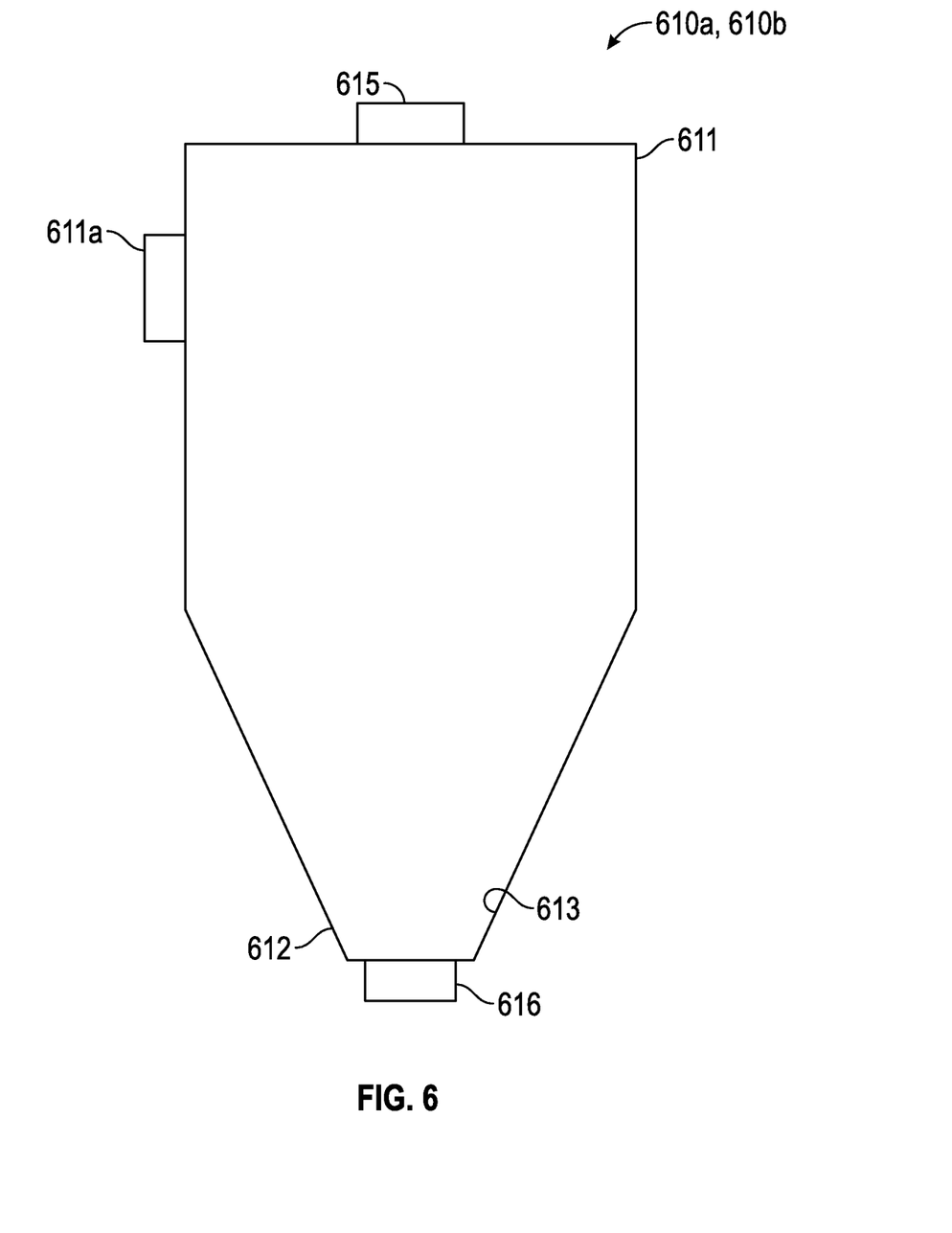
FIG. 6 is a side view of a liquid-liquid hydrocyclone of the three phase embodiment of the subsea separation system of FIG. 5.

Referring now to FIGS. 5 and 6, the first remaining oily water stream 71 enters a first liquid-liquid hydrocyclone 610a of the water treatment system 600, and the second remaining oily water stream 73 enters a second liquid-liquid hydrocyclone 610b of the water treatment system 600. The liquid-liquid hydrocyclones 610a, 610b are designed to work in parallel and include a cylindrical inlet 611 and a tapered tube 612 with the oily water streams 71, 73 entering through tangential inlets 611a. Centrifugal forces act on the heavier water as it flows down a liner wall, the fluid then accelerates as the cross-section narrows in the tapered tube 612 developing forces to separate the oil droplets. Centrifugal forces acting on the heavier water cause the water to migrate to the wall 613 of the tapered section 612 while the lighter oil is displaced and removed through the reject 615. The heavier phase (i.e., water) will exit at the underflow 616 in first and second de-oiled water stream 75, 77, respectively, while the lighter phase (i.e., oil) falls into reverse flow and exits the overflow 615 at the opposite end in first and second oily reject stream 76, 78, respectively. The level control valves 650c, 650d are disposed downstream of first and second liquid-liquid hydrocyclones 610a, 610b, respectively, to avoid shear from the valves 650c, 650d that may decrease oil drop size and negatively impact performance of the liquid-liquid hydrocyclones 610a, 610b, respectively. Each liquid-liquid hydrocyclone 610a, 610b is controlled externally with a pressure differential ratio control valve 650a, 650b, respectively, which controls the flow split between the de-oiled water stream underflow 75, 77 and the oily reject overflow 76, 78. Any liquid-liquid hydrocyclone known in the art suitable for separating two liquids with differing densities may be used.

The de-oiled water stream underflow 75, 77 exiting the first and second liquid-liquid hydrocyclones 610a, 610b, respectively, combine to form combined de-oiled water stream 79 and enter a solid-liquid hydrocyclone 620 to separate additional residual solids from stream 79. Rejected solids stream 83 exits the solid-liquid hydrocyclone 620 as underflow and is controlled with a flow ratio control valve 650e that allows a portion of the entering combined de-oiled water stream 79 to be discharged to the underflow in solids stream 83. Cleaner process water stream 81 exits the top of the solid-liquid hydrocyclone 620 as overflow and enters a third liquid-liquid hydrocyclone 630 to separate additional residual oil from the stream 81. Any solid-liquid hydrocyclone known in the art suitable for removing solids from fluid streams may be used.

Referring to FIG. 5, after cleaner process water stream 81 enters the third liquid-liquid hydrocyclone 630, the heavier phase (i.e., water) will exit as underflow in a polished water stream 85 while the lighter phase (i.e., oil) falls into reverse flow and exits as overflow in a third oily reject stream 80. The liquid-liquid hydrocyclone 630 is controlled by the flow rate of the third oily reject overflow stream 80 through a pressure differential ratio control valve 650f, which controls the flow based on a differential pressure between the inlet cleaner process water stream 81 and the outlet polished water stream underflow 85 and the outlet third oily reject overflow 80. The desanded and de-oiled polished water stream 85 enters pump 750, which pressurizes and discharges pump discharge stream 87 through liquid pipeline 42 for reinjection into the water injection well(s) 11 (see FIG. 1). Any liquid-liquid hydrocyclone known in the art suitable for separating two liquids with differing densities may be used.

The first oily reject stream 76 exiting the first liquid-liquid hydrocyclone 610a is combined with rejected solids stream 83 exiting the solid-liquid hydrocyclone 620, the second oily reject stream 78 exiting the second liquid-liquid hydrocyclone 610b, and the third oily reject stream 80 exiting the third liquid-liquid hydrocyclone 630 to form combined reject stream 82. The combined reject stream 82 is at a lower pressure compared to the second oil stream 72. An ejector system 800 is used to boost the pressure of reject stream 82. A portion 99 of pump discharge stream 87 is redirected and used as motive stream 99 to boost the pressure of combined reject stream 82 in the ejector 800 resulting in boosted stream 84 having an increased pressure over the combined reject stream 82. Boosted stream 84 is injected into second oil stream 72, which is boosted by oil pump 450 and transported topside 5 through oil outlet line 40. The flow rate of the motive stream 99 is controlled by a differential pressure control valve 850 that maintains a constant differential pressure across valve 650f by adjustment of the motive stream 99 flow so the pressure in the combined reject stream 82 is low enough to allow the hydrocyclone rejects to flow into combined reject stream 82. This control arrangement provides for minimum usage of motive stream 99 for possible normal and transient operating pressures for second oil stream 72.

Prior to reinjecting the pump discharge stream 87 through liquid pipeline 42 for reinjection into the well(s) 11 (see FIG. 1), the boosted pump discharge stream 87 can also be redirected back to the horizontal separator 300 for sand jetting and can be redirected to supply motive fluid back to the desander accumulator 175 to flush accumulated solids 51a.

Referring now to FIGS. 4 and 5, a liquid recycle system 500b maintains a minimum flow rate through the pump 750 with multivariable controllers (not shown) that controls choke valve 760 located downstream of pump 750. The liquid recycle system 500b allows a portion 89 of the pump discharge stream 87 discharged from the pump 750 to be redirected back into the horizontal separator vessel 305 at inlet 335. For simplicity, the path of the redirected pump discharge stream 89 is not shown and is instead represented by "A" to show the proximate origination and termination of redirected stream 89. The liquid recycle system 500b of the present three phase embodiment 2000 is similar to the liquid recycle system 500a of the two phase separation embodiment 1000. The amount of redirected pump discharge stream 89 used is determined from the flow needed to supply minimum flow conditions of the pump 750 or the flow needed to supply sand jetting into the horizontal separator vessel 305. The redirected pump discharge stream 89 can also be reintroduced into the horizontal separator 300 for sand jetting.

In the present embodiment, the vertical separator vessel 305 is similar to the vertical separator 305 of the two phase separation configuration 1000. Like parts are designated with like reference numerals. Referring now to FIGS. 4 and 5, in a sand jetting cycle, the redirected pump discharge stream 89 enters the horizontal separator vessel 305 at inlet 335 and hits the sand jet header 340 and disburses across the bottom of the horizontal separator vessel 305 to flush out sand from the horizontal vessel 305; thus, redirected pump discharge stream 89 may also be referred to as motive stream 89. As with the two phase separator embodiment, a sand jetting cycle is initiated either manually or automatically using a timer or a set point level of sand accumulation.

Referring now to FIG. 5, when the level of accumulated solids 51a becomes higher than a predetermined level or set point in the desander accumulator 175, a flushing cycle is initiated to flush the solids 51a out of the desander accumulator 175. In the present embodiment, the vertical separator vessel 305 is similar to the vertical separator 305 of the two phase separation configuration 1000. Like parts are designated with like reference numerals. The valve 160 between the wellhead desander 150 and the desander accumulator 175 is closed to allow normal operation through the remaining portions of separation system 2000, and valves 185, 190 are opened to allow a portion 91 of the pressurized discharge fluid 87 from pump 750 be redirected to enter the desander accumulator 175. The redirected portion 91 of the pressurized discharge fluid 87 is used to fluidize the accumulated solids 51a and flush the solids 51a out of the desander accumulator 175; thus, redirected portion 91 may also be referred to as a motive fluid 91. The motive fluid 91 enters the accumulator 175 and fluidizes the settled solids 51a bed that has at its core a low pressure vortex that acts to induct the solids 51a from the accumulator 175 in a discharged slurry 93. The discharged slurry 93 is further diluted with dilution fluid 95, which is also sourced from the motive fluid 91 exiting the pump 750. The addition of the dilution fluid 95 further dilutes the solids 51a and increases the velocity to provide flow assurance and prevent plugging of the lines. An amount of the dilution fluid 95 is used to achieve a predefined concentration of solids 51a that facilitates transportation of the combined discharged slurry 93 and dilution fluid 95, or diluted slurry 97. The diluted slurry 97 is combined back with oil stream 74 in oil outlet pipeline 40 downstream of the level control valve 550. For simplicity, the path of the diluted slurry 97 is not shown and is instead represented by "B" to show the proximate origination and termination of diluted slurry 97. Flushing the solids 51a collected in the desander accumulator 175 is an intermittent process done as needed based on the level of solids 51a.

A control system 3000 enables compact separation design by providing fast and reliable valve action. A dynamic process simulation model may incorporate separation equipment and all control units along with pipelines and risers. System lags and delays may be applied to enable realistic performance evaluation. Lags and delays may include process instrumentation measurements, valve actuation, communication lags, and pump speed response. Advanced control schemes may be implemented to achieve stable operation without high/low level shutdowns. Step and ramp increments to inlet flow might then be analyzed to determine system capabilities in handling perturbations. Slug patterns were established in statistical forms using pipeline simulation models and an operational database. This assessment provides an example of a comprehensive screening method for a practical control system and confirmation of separator design in handling transient flow. In an embodiment, the subsea separation system 100 may operate using closed control loops with fast-acting all-electric controls that allow compact vessel design and functions reliably in a slugging flow regime.

The proposed separation system 100 comprises a configuration of a horizontal vessel 300 downstream of a vertical cyclonic gas liquid separator 200, which enhances slug handling capability and provides sufficient time between alarms and trips. In one example, both the vertical and horizontal vessels 200, 300, respectively, are hydraulically balanced to enable stable operation via common level and pressure control valves.

Further, the liquid level of a subsea gas liquid separator can be controlled via split range control where a level control valve 550 and liquid discharge pump speed are both adjusted to optimize the control operation. The level control valve 550 can be used to generate a flow of fluid that can be used for the flushing operation of the desander accumulator 175. The pump minimum recycle loop 500*a*, 500*b* might be configured to also function as the supply line for sand jetting horizontal separator 300.

In some embodiments, a configuration of multi-stage hydrocyclones 600, including liquid-liquid 610*a*, 610*b*, 630 and solid-liquid hydrocyclones 620, is employed for produced water treatment in a subsea environment and to further enable water re-injection. In particular, the configuration of hydrocyclones assists in breaking solids-stabilized emulsion particles and increases overall efficiency of solids removal from the water.

Controllers may be implemented with appropriate deadbands in order to reduce fluctuations. Freezing the controller output while the process variable is within an acceptable range of the set point reduces the number of cycles that would be required of the control valve. This loss in control is acceptable because it increases the expected lifetime of the control valve and valve actuator.

Proposed extensions of the present disclosure include detailed study using coupled dynamic multiphase flow simulation model with the dynamic process simulation model. Slugging regimes predicted by the dynamic multiphase flow simulation pipeline model do not take into account the changing conditions due to the processing system. Combining both models will provide a more accurate slugging profile. Also, controller tuning may be optimized using advanced auto-tuning methods.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order, and disclosed features and components can be arranged in any suitable combination to achieve desired results.

What is claimed is:

1. A system for subsea fluid phase separation, comprising:
a vertical gas-liquid separation module having at least one associated valve and configured to produce a liquid output stream;
a horizontal gas-liquid separation module having at least one associated valve and disposed in series with the vertical gas-liquid separation module, wherein the horizontal gas-liquid separation module is configured to produce an oil-water mixture stream and to receive the liquid output stream produced by the vertical gas-liquid separation module, and wherein the horizontal gas-liquid separation module comprises a first inlet in fluid communication with the vertical gas-liquid separation module and configured to receive the liquid output stream, a second inlet, and a plurality of outlets disposed in a bottom portion of the horizontal gas-liquid separation module;
one or more first pumps to provide fluid flow out of the vertical and horizontal gas-liquid separation modules; and
a control system to control operation of the one or more first pumps and the associated valves.

2. The system of claim 1, wherein the horizontal gas-liquid separation module further comprises a header device configured to disperse fluid entering the second inlet across the bottom portion of the horizontal gas-liquid separation module for settled solids removal.

3. The system of claim 2, wherein the fluid entering the second inlet is a portion of a fluid discharged from the one or more first pumps.

4. The system of claim 1 wherein the control system further comprises:
a split-range controller configured to:
adjust at least one of the associated valves and adjust a discharge speed of at least one of the one or more first pumps to optimize operation.

5. The system of claim 4, wherein a minimum flow control loop of the at least one of the one or more first pumps is configured to be utilized for a desanding operation of the vertical and horizontal gas-liquid separation modules.

6. The system of claim 1, further comprising:
an oil-water separation module comprising at least one vessel having an associated valve; and
one or more second pumps to enable produced water re-injection;
wherein the control system is further configured to control operation of the valve associated with the at least one vessel of the oil-water separation module.

7. The system of claim 6, further comprising:
at least one liquid-liquid hydrocyclone in series with a solid-liquid hydrocyclone in series with an additional liquid-liquid hydrocyclone for produced water treatment to enable water re-injection.

8. The system of claim 7, further comprising:
an ejector configured to boost pressure of a reject flow exiting one or more of the liquid-liquid hydrocyclones and/or the solid-liquid hydrocyclone.

9. A method for subsea fluid phase separation, comprising:
configuring a horizontal vessel in series with a vertical gas-liquid separation vessel;
producing a liquid output stream from the vertical gas-liquid separation vessel;
flowing the liquid output stream from the vertical gas-liquid separation vessel into the horizontal vessel;
flowing an oil-water mixture stream from the horizontal vessel to a first oil-water separation vessel;
flowing a separated oil stream from the first oil-water separation vessel to a second oil-water separation vessel;
receiving an indication of a level or a pressure of the horizontal vessel and the vertical gas-liquid separation vessel; and
performing, based on the indication, a processing operation that:
generates a control signal to control operation of a pump that provides fluid flow into and/or out of the vessels; or
generates a control signal to control operation of at least one valve associated with the vessels.

10. The method of claim 9, further comprising using a level control valve to generate motive fluid for a solids accumulator flushing operation.

11. The method of claim 9 further comprising combining a dynamic multiphase flow simulation model with a dynamic process simulation model.

12. The method of claim 11 further comprising:

including processing conditions in the dynamic multiphase flow simulation model using the dynamic process simulation model; then predicting a slugging profile using the dynamic multiphase flow simulation model.

13. A method to control and discharge hydrocyclone rejects to an oil pipeline using an ejector subsea, the method comprising:

controlling a motive fluid rate to the ejector by setting a constant differential pressure across a control valve that receives a flow of rejects exiting a last hydrocyclone in a series of hydrocyclones, thereby providing a driving force for the rejects from the series of hydrocyclones and optimizing the motive fluid rate.

14. The method of claim 13 wherein the series of hydrocyclones further comprises at least one liquid-liquid hydrocyclone in series with a solid-liquid hydrocyclone in series with an additional liquid-liquid hydrocyclone.

15. A system comprising:

a configuration of multi-stage hydrocyclones, including a liquid-liquid hydrocyclone in series with a solid-liquid hydrocyclone in series with another liquid-liquid hydrocyclone, for produced water treatment in a subsea environment to enable water re-injection; and a control system comprising a dynamic multiphase flow simulation model coupled with a dynamic process simulation model;

wherein the configuration of multi-stage hydrocyclones causes breaking of solids-stabilized emulsion particles in the water and solids removal from the water prior to water re-injection.

16. The system of claim 15 wherein the control system is configured to combine processing conditions of the dynamic process simulation model with a slugging profile of the dynamic multiphase flow simulation model.

17. The system of claim 15, further comprising:

an ejector configured to boost pressure of a reject flow exiting one or more of the liquid-liquid hydrocyclones and/or the solid-liquid hydrocyclone.

18. The system of claim 15, wherein the process simulation model incorporates the configuration of multi-stage hydrocyclones.

* * * * *